United States Patent
Richards et al.

(10) Patent No.: US 10,788,685 B2
(45) Date of Patent: Sep. 29, 2020

(54) SYSTEMS AND METHODS FOR ASTIGMATISM CORRECTION IN A HEAD-MOUNTED DISPLAY

(71) Applicant: FACEBOOK TECHNOLOGIES, LLC, Menlo Park, CA (US)

(72) Inventors: Evan M. Richards, Fremont, CA (US); Weihua Gao, Foothill Ranch, CA (US); Daozhi Wang, Dublin, CA (US)

(73) Assignee: Facebook Technologies, LLC, Menlo Park, CA (US)

(*) Notice: Subject to any disclaimer, the term of this patent is extended or adjusted under 35 U.S.C. 154(b) by 58 days.

(21) Appl. No.: 15/906,295

(22) Filed: Feb. 27, 2018

(65) Prior Publication Data
US 2019/0265514 A1 Aug. 29, 2019

(51) Int. Cl.
| | |
|---|---|
| *G02C 7/08* | (2006.01) |
| *G02C 7/02* | (2006.01) |
| *G02B 27/00* | (2006.01) |
| *G02B 3/06* | (2006.01) |
| *G02B 27/01* | (2006.01) |
| *G06F 1/16* | (2006.01) |

(52) U.S. Cl.
CPC ............. *G02C 7/083* (2013.01); *G02B 3/06* (2013.01); *G02B 27/0068* (2013.01); *G02B 27/0172* (2013.01); *G02C 7/022* (2013.01); *G02B 2027/011* (2013.01); *G02B 2027/0178* (2013.01); *G02C 2202/22* (2013.01); *G02F 2203/28* (2013.01); *G06F 1/163* (2013.01)

(58) Field of Classification Search
CPC combination set(s) only.
See application file for complete search history.

(56) References Cited

U.S. PATENT DOCUMENTS

| | | | |
|---|---|---|---|
| 8,848,120 B2 | 9/2014 | Jeon | |
| 9,599,853 B2 | 3/2017 | Sugita | |
| 2011/0221656 A1* | 9/2011 | Haddick | G02B 27/017 345/8 |
| 2011/0292266 A1* | 12/2011 | Duston | G02B 3/14 348/308 |
| 2012/0293861 A1* | 11/2012 | Harder | G02B 27/0025 359/356 |
| 2014/0152925 A1 | 6/2014 | Wu | |
| 2017/0219827 A1 | 8/2017 | Pan | |

OTHER PUBLICATIONS

Rigler, Martin, "Tunable-Focus Liquid Crystal Lens," University of Ljubljana, Faculty of Mathematics and Physics (Oct. 6, 2009).

* cited by examiner

*Primary Examiner* — Lauren Nguyen
(74) *Attorney, Agent, or Firm* — FisherBroyles, LLP

(57) ABSTRACT

The disclosed system may include (1) a lens assembly that provides an electronically controllable cylindrical power, oriented along an electronically controllable axis, on an optical path between a display device and an eye of a viewer in response to at least one first control signal, and (2) a controller that (a) receives information indicating a cylindrical power component and a cylindrical axis component of an eyeglass prescription for the viewer, and (b) generates, based on the information, the at least one first control signal to cause the lens assembly to provide the cylindrical power component, oriented along the cylindrical axis component, for the viewer. Various other systems and methods are also disclosed.

13 Claims, 7 Drawing Sheets

System
100

SYSTEMS AND METHODS FOR ASTIGMATISM CORRECTION IN A HEAD-MOUNTED DISPLAY

BACKGROUND

In at least some current head-mounted displays (HMDs), such as those employed in virtual reality (VR) systems, augmented reality (AR) systems, mixed reality (MR) systems, and the like, a viewer that requires prescription eyeglasses (e.g., a viewer that is not a candidate for optical correction via contact lenses or refractive surgery) may experience some difficultly or discomfort when wearing those eyeglasses while using an HMD (e.g., due to space constraints within the HMD).

Some HMDs may include a varifocal optical system in which a focal distance between two or more components (e.g., between one or more of the viewer's eye, a display device, a viewing lens, and/or the like) may be altered during use to simulate differences in distance between the user and objects portrayed on the display device. Consequently, the same varifocal optical system, in some examples, may also be employed to correct for a spherical component of a viewer's eyeglass prescription, thus possibly allowing the viewer to use such an HMD without eyeglasses.

However, certain viewers may also exhibit some level of astigmatism, which typically results from an asymmetrical (e.g., non-spherical) shape of the cornea or lens of the eye that may cause light rays propagating in different planes to have different foci. Viewers that require eyeglasses for astigmatism correction may thus encounter vision difficulties during use of an HMD, including those HMDs that employ a varifocal optical system.

SUMMARY

As will be described in greater detail below, the instant disclosure describes systems and methods for astigmatic correction, such as what might be used in a head-mounted display (HMD). In one example, a system may include (1) a lens assembly that provides an electronically controllable cylindrical power, oriented along an electronically controllable axis, on an optical path between a display device and an eye of a viewer in response to at least one first control signal, and (2) a controller that (a) receives information indicating a cylindrical power component and a cylindrical axis component of an eyeglass prescription for the viewer, and (b) generates, based on the information, the at least one first control signal to cause the lens assembly to provide the cylindrical power component, oriented along the cylindrical axis component, for the viewer. In some examples, the lens assembly may include (1) a first liquid crystal lens that provides the electronically controllable cylindrical power, and (2) a rotational actuator, coupled to the first liquid crystal lens, that orients the first liquid crystal lens along the electronically controllable axis. In other embodiments, the lens assembly may include (1) a first liquid crystal lens providing a first electronically controllable cylindrical power, oriented along a first constant axis, and (2) a second liquid crystal lens providing a second electronically controllable cylindrical power, oriented along a second constant axis that is rotationally offset from the first constant axis, where the controller may determine, based on the information, the first and second electronically controllable cylindrical powers that result in providing the cylindrical power component, oriented along the cylindrical axis component, for the viewer. In some such examples, a rotational offset between the first constant axis and the second constant axis may range from greater than zero degrees to less than 180 degrees. Moreover, in some embodiments, the rotational offset between the first constant axis and the second constant axis may be approximately 45 degrees.

In some embodiments, the system may include an actuator that alters a distance between the display device and the eye of the viewer based on at least one second control signal, where the controller may (a) receive further information indicating a spherical power component of the eyeglass prescription for the viewer, and (b) generate, based on the further information, the at least one second control signal to compensate for the spherical power component for the viewer. In other examples, the system may include (1) a viewing lens on the optical path between the display device and the eye of the viewer, and (2) an actuator that alters a distance between the viewing lens and the display device based on at least one second control signal, where the controller may (a) receive further information indicating a spherical power component of the eyeglass prescription for the viewer; and (b) generate, based on the further information, the at least one second control signal to compensate for the spherical power component for the viewer.

In some examples, the system may also include an input interface that receives the information indicating the cylindrical power component and the cylindrical axis component of the eyeglass prescription for the viewer. Furthermore, in some embodiments, the system may include (1) a memory that stores the information received via the input interface, and (2) a biometric device that detects a biological characteristic of the viewer, where the controller may (a) determine an identity of the viewer based on the biological characteristic of the viewer, and (b) retrieve the information from the memory based on the identity of the viewer. In some examples, the biological characteristic may include a characteristic of at least one of a fingerprint, an iris, or a retina of the viewer.

In other implementations, the system may also include a biometric device that detects a biological characteristic of the viewer, and the controller may generate, based on the biological characteristic, the information indicating the cylindrical power component and the cylindrical axis component of the eyeglass prescription for the viewer. In such cases, the biometric device may include an optical wavefront sensor.

In one example, a system may include (1) a display device that provides an image to be viewed by a viewer, (2) a lens assembly that provides an electronically controllable cylindrical power, oriented along an electronically controllable axis, on an optical path between the display device and an eye of the viewer in response to at least one first control signal, (3) an actuator that alters an effective focal length between the eye of the viewer and the display device based on at least one second control signal, and (4) a controller that (a) receives information indicating a spherical power component, a cylindrical power component, and a cylindrical axis component of an eyeglass prescription for the viewer, (b) generates, based on the information, the at least one first control signal to cause the lens assembly to provide the cylindrical power component, oriented along the cylindrical axis component, for the viewer, and (c) generates, based on the information, the at least one second control signal to compensate for the spherical power component for the viewer. In some embodiments, the lens assembly may include (1) a first liquid crystal lens that provides the electronically controllable cylindrical power, and (2) a rotational actuator, coupled to the first liquid crystal lens, that orients the first liquid crystal lens along the electronically controllable axis. In other examples, the lens assembly may include (1) a first liquid crystal lens providing a first electronically controllable cylindrical power, oriented along a first constant axis, and (2) a second liquid crystal lens providing a second electronically controllable cylindrical power, oriented along a second constant axis that is rotationally offset from the first constant axis, where the controller may determine, based on the information, the first and second electronically controllable cylindrical powers that result in providing the cylindrical power component, oriented along the cylindrical axis component, for the viewer.

In some examples, the actuator may move the display device relative to the eye of the viewer to alter the effective focal length between the eye of the viewer and the display device based on the at least one second control signal. In other embodiments, the system may further include a viewing lens on the optical path between the display device and the eye of the viewer, and the actuator may move the viewing lens relative to the display device to alter the effective focal length between the eye of the viewer and the display device based on the at least one second control signal.

In one example, a method may include (1) receiving information indicating a cylindrical power component and a cylindrical axis component of an eyeglass prescription for a viewer, (2) generating, based on the information, at least one control signal for a lens assembly located on an optical path between a display device and an eye of the viewer, where the lens assembly provides an electronically controllable cylindrical power, oriented along an electronically controllable axis, and (3) providing, using the lens assembly based on the at least one control signal, the cylindrical power component, oriented along the cylindrical axis component, for the viewer. In some embodiments, the lens assembly may include (1) a first liquid crystal lens that provides the electronically controllable cylindrical power, and (2) a rotational actuator, coupled to the first liquid crystal lens, that orients the first liquid crystal lens along the electronically controllable axis. In other examples, the lens assembly may include (1) a first liquid crystal lens providing a first electronically controllable cylindrical power, oriented along a first constant axis, and (2) a second liquid crystal lens providing a second electronically controllable cylindrical power, oriented along a second constant axis that is rotationally offset from the first constant axis, where generating the at least one control signal may include determining, based on the information, the first and second electronically controllable cylindrical powers that result in providing the cylindrical power component, oriented along the cylindrical axis component, for the viewer.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
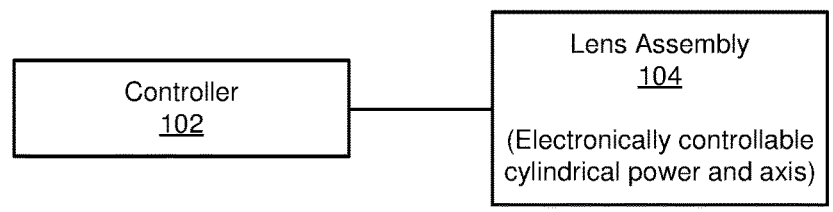
FIG. 1 is a block diagram of an exemplary system for astigmatism correction (e.g., in a head-mounted display (HMD)).

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods of astigmatic correction for a viewer that may be employed in HMDs, such as those employed in VR systems, AR systems, MR systems, and the like. As will be explained in greater detail below, embodiments of the instant disclosure may facilitate use of an HMD by a viewer without the use of prescription eyeglasses that that user may otherwise require to clearly view images presented by the HMD.

Figure 2:
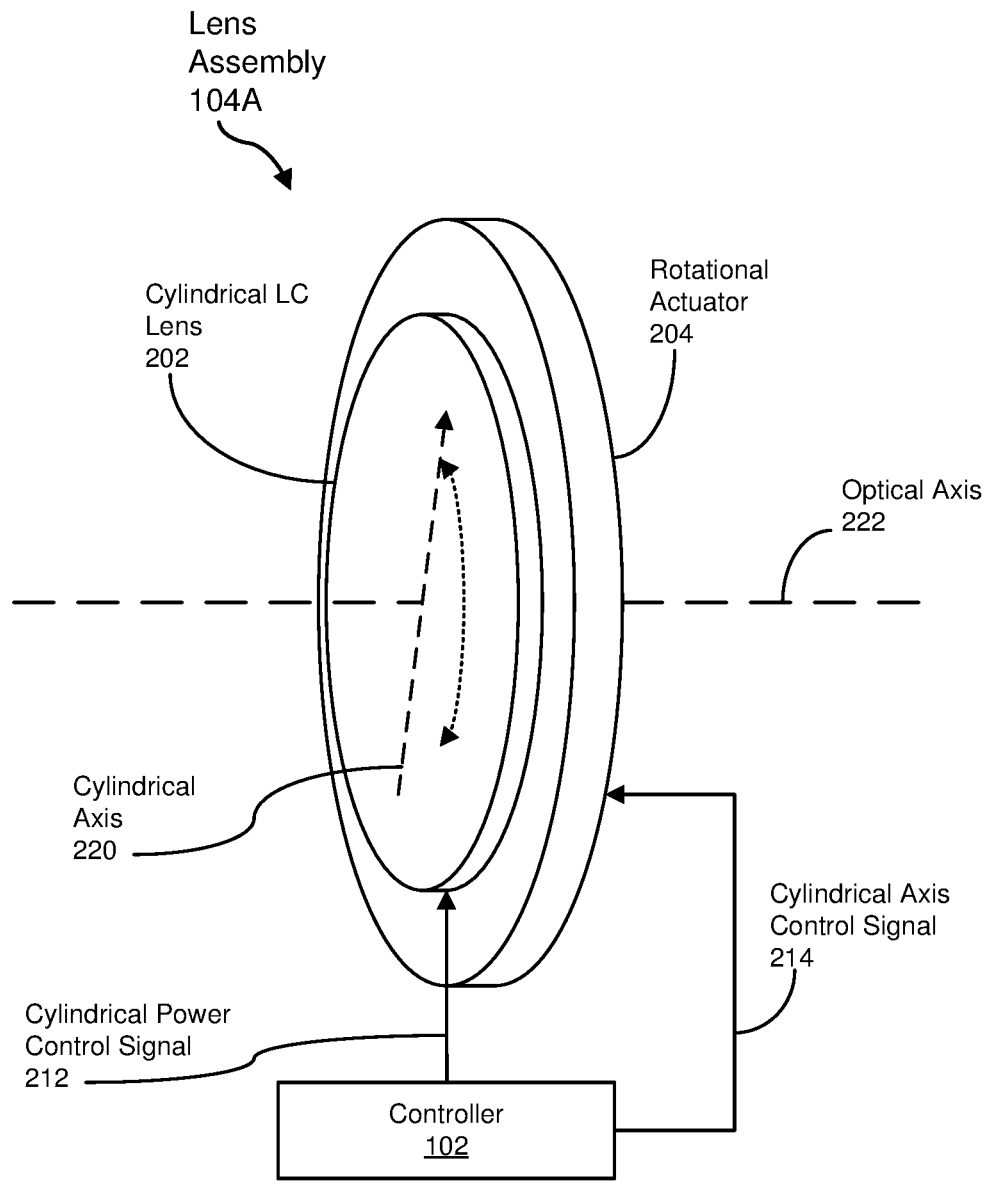
FIG. 2 is a perspective view of an exemplary lens assembly employable in the exemplary system of FIG. 1.
Figure 3:
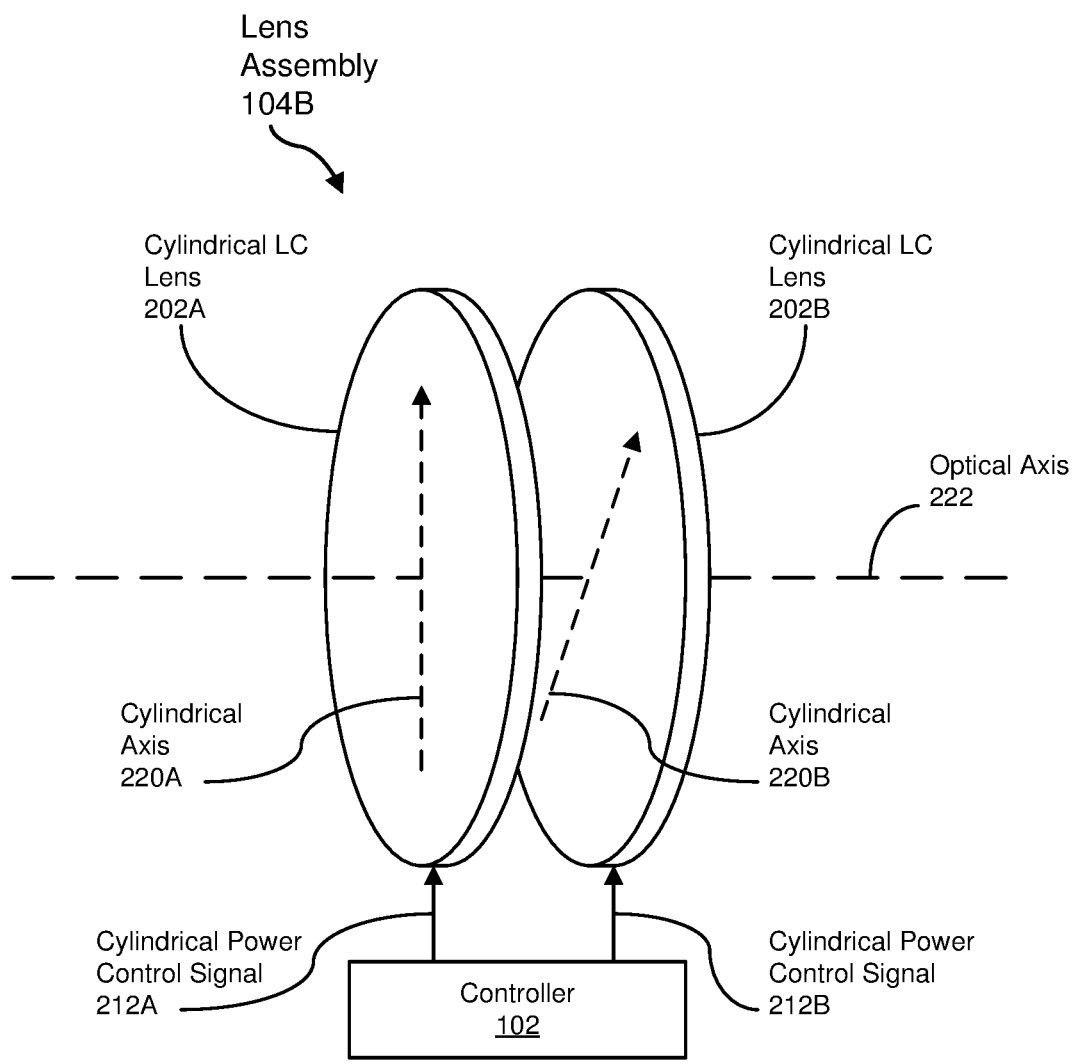
FIG. 3 is a perspective view of another exemplary lens assembly employable in the exemplary system of FIG. 1.
Figure 4:
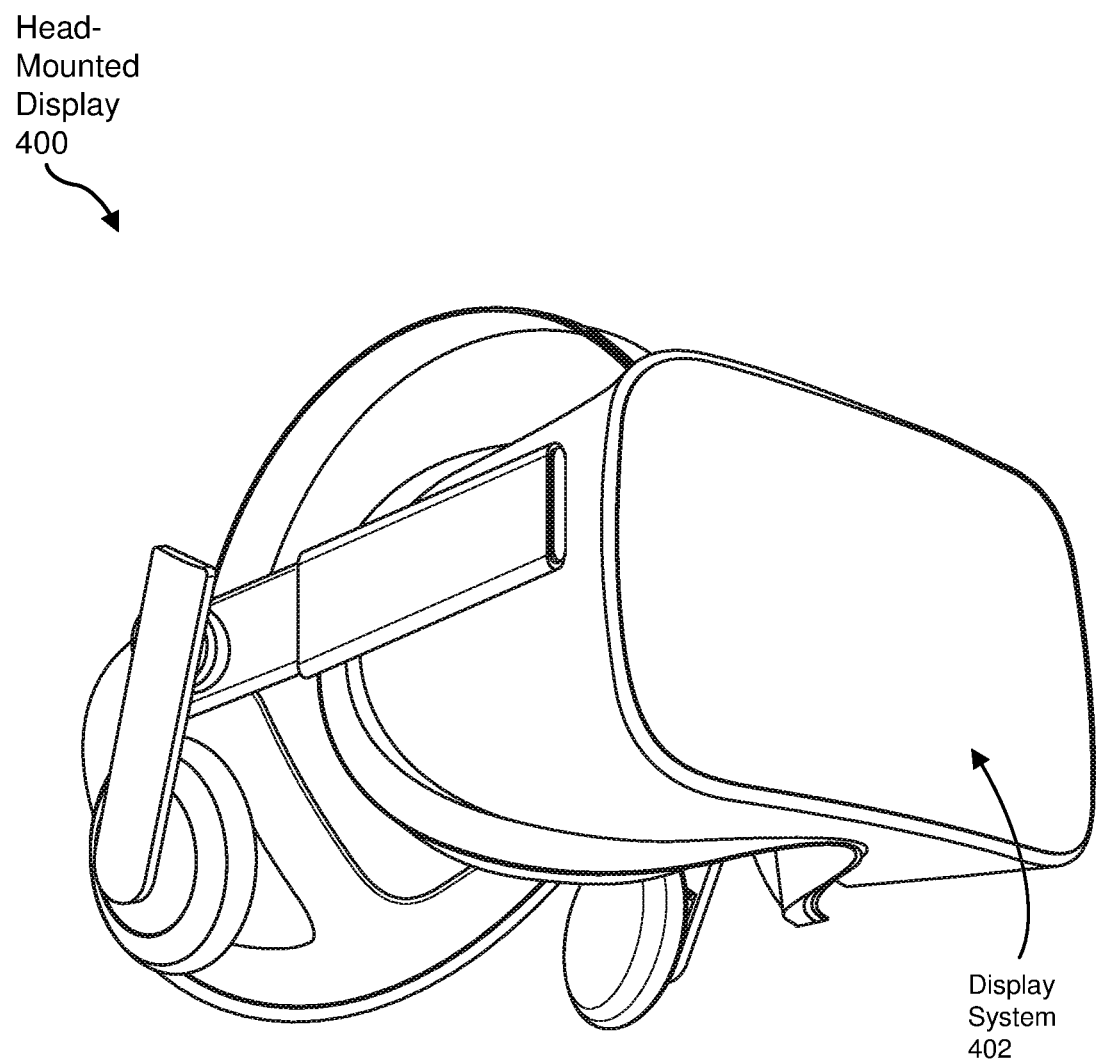
FIG. 4 is a perspective view of an exemplary HMD in which an exemplary display system for providing astigmatic correction may be employed.

The following will provide, with reference to FIGS. 1-7, detailed descriptions of systems and methods for astigmatic correction in HMDs and similar viewing systems. An exemplary system for astigmatic correction that includes a controller and an electrically controllable lens assembly is discussed in conjunction with FIG. 1. Two exemplary lens assemblies employable in the exemplary system of FIG. 1 are discussed in connection with FIGS. 2 and 3. An exemplary HMD is presented in reference to FIG. 4, and an exemplary system for astigmatic correction employable in the exemplary HMD of FIG. 4 is discussed in connection with FIGS. 5 and 6. In conjunction with FIG. 7, an exemplary method of astigmatic correction is discussed.

FIG. 1 is a block diagram of an exemplary system 100 for astigmatic correction that may be employed in various display systems, including, but not limited to, HMDs. System 100, in some embodiments, may include a controller 102 and a lens assembly 104. In at least some examples, lens assembly 104 may provide a cylindrical power and associated cylindrical axis that are electronically controllable. In some examples, the term "electronically controllable," as used herein, may refer to any electronic means by which a level of cylindrical power and/or an orientation of cylindrical axis provided by lens assembly 104 may be controlled (e.g., via digital values, electrical voltage, electrical current, or the like). In some embodiments described below, lens assembly may incorporate one or more liquid crystal lenses (LCLs). However, other electronically controllable components that may provide a controllable cylindrical power and/or cylindrical axis may be employed in other embodiments.

Additionally, as employed herein, the terms "spherical power," "cylindrical power," and "cylindrical axis" may correspond to the "sphere," "cylinder," and "axis" components of a corrective lens, or eyeglass, prescription, as is typically specified for a contact lens or eyeglass lens for each eye of a user. In at least some examples, the sphere component specifies a spherical correction (e.g., for hyperopia (farsightedness), myopia (nearsightedness), presbyopia (focusing difficulty based on hardening of the human lens), and so on) in which the amount of correction is the same for light rays propagating in every direction perpendicular to the optical axis of the eye.

Generally, proper optical correction for people with astigmatism may require more than simple spherical correction due to the asymmetrical (e.g., non-spherical) shape of the cornea or lens of the eye associated with astigmatism, as spherical correction cannot address the differences in corrective power along different axes (sometimes called "meridians") perpendicular to the optical axis. Consequently, the cylinder and axis components of the typical eyeglass prescription are intended to provide a more comprehensive optical correction. In at least some examples, the cylinder component specifies a maximum negative or positive optical power offset relative to the sphere component of the prescription, while the axis component defines the axis of orientation of the greatest or least amount of power correction (e.g., as defined by the sphere and cylinder components) relative to some absolute orientation (e.g., horizontal). In some embodiments, the axis component may specify the orientation of the meridian aligned with the sphere component or the cylinder component, either of which may be associated with the least or greatest amount of correction being applied. In some examples, the meridians associated with the least and greatest amount of correction may be separated by 90 degrees.

Consequently, in at least some examples employed herein, lens assembly 104 may provide an electronically controllable cylindrical power that may correspond to the cylinder component of an eyeglass prescription, or some power component related thereto. Moreover, lens assembly 104 may provide an electronically controllable cylindrical axis that may correspond to the axis component of an eyeglass prescription, or some other orientation offset from the axis component (e.g., by 90 degrees).

Moreover, in some examples discussed below, the astigmatic correction provided in the various systems and methods presented herein may be combined with spherical correction such that a complete eyeglass prescription, as represented by the sphere, cylinder, and axis components, may be facilitated for an eye of a viewer. Further, in some embodiments, a system and/or method may operate to apply a separate eyeglass prescription for each eye of the viewer.

FIG. 2 is a perspective view of an exemplary lens assembly 104A employable in system 100 of FIG. 1. Lens assembly 104A, in some examples, may include a cylindrical liquid crystal lens (LCL) 202 coupled to a rotational actuator 204. In some embodiments, an LCL, as used herein, may be a substantially transparent structure (e.g., a substantially planar structure including glass or a polymer) that may include liquid crystals that align in response to an electronic stimulus (e.g., an electric field) to provide a controllable refractive index for the structure. Moreover, cylindrical LCL 202 may provide a controllable refractive index that provides refractive power of some maximum value along a first meridian while maintaining substantially zero power along a second meridian perpendicular to the first meridian. In the example of FIG. 2, a cylindrical axis 220 of cylindrical LCL 202 may be defined as being aligned with the first meridian in some embodiments, or may be defined as being aligned with the second meridian in other embodiments. In some examples, the amount of refraction is electronically controllable by way of a cylindrical power control signal 212 generated by controller 102. Moreover, in some embodiments, the resulting cylindrical power of cylindrical LCL 202 (as well as other cylindrical LCLs described herein) may be zero, positive, or negative. As indicated in the example of FIG. 2, cylindrical LCL 202 may not present a physical cylindrical curvature and, in some examples, may exhibit more of a planar structure. Instead, the characterization of cylindrical LCL 202 refers to the light refraction provided as corresponding primarily to that of a cylindrical lens.

In at least some examples, the orientation of cylindrical axis 220 may be constant relative to cylindrical LCL 202 itself. Accordingly, cylindrical LCL 202 may be coupled to rotational actuator 204 such that cylindrical LCL 202 (and, consequently, cylindrical axis 220) may be rotated about an optical axis 222 of an optical system (e.g., an optical system of an HMD) associated with system 100. Further, rotational actuator 204 may rotate cylindrical LCL 202 in response to a cylindrical axis control signal 214 generated by controller 102. In the particular example of FIG. 2, rotational actuator 204 may include a central opening, the edge of which may be connected to one or more portions of a perimeter of cylindrical LCL 202 so that light (e.g., from a display device) may pass through cylindrical LCL 202 without obstruction by rotational actuator 204. However, other physical structures or configurations embodying rotational actuator 204 and its coupling to cylindrical LCL 202 are also possible. In some embodiments, any of various types of electronically controllable drives (e.g., stepper motor, voice coil actuator, or the like) of rotational actuator 204 may cause rotation of cylindrical LCL 202 about optical axis 222. Thus, by generating cylindrical power control signal 212 to control a cylindrical optical power by altering a cylindrical refractive index of cylindrical LCL 202 for an eye of a particular viewer, and by generating cylindrical axis control signal 214 for rotational actuator 204 to rotate cylindrical LCL 202 about optical axis 222 to align cylindrical axis 220 appropriately for the eye of the viewer, lens assembly 104A may provide astigmatic correction for the eye of the viewer.

Controller 102, in some embodiments, may include analog and/or digital hardware, one or more processors that execute software or firmware instructions, or some combination thereof to generate cylindrical power control signal 212 and cylindrical axis control signal 214 to provide astigmatic correction for an eye of a viewer. According to some embodiments, either or both of cylindrical power control signal 212 and cylindrical axis control signal 214, as well as other control signals described herein, may include one or more individual signals. Further, in some examples, controller 102 may drive control signals 212 and 214 by way of one or more open loop control systems. In other embodiments, system 100 may include one or more sensors (e.g., positional sensors, rotational sensors, and so forth) (not shown in FIG. 2 or 3) that provide positional and/or rotational information to controller 102 so that controller 102 may implement one or more closed loop control systems to generate control signals 212 and 214.

FIG. 3 is a perspective view of another exemplary lens assembly 104B employable in system 100 of FIG. 1. Lens assembly 104B, in some embodiments, may include a first cylindrical LCL 202A and a second cylindrical LCL 202B aligned along optical axis 222 of an optical system, such as an optical system of an HMD. As with cylindrical LCL 202 of FIG. 2, cylindrical LCLs 202A and 202B may each provide a controllable refractive index that provides refractive power of some maximum value along a first meridian while maintaining substantially zero power along a second meridian perpendicular to the first meridian. Further, in some embodiments, first cylindrical LCL 202A may define a first cylindrical axis 220A, while the second cylindrical LCL 202B may define a second cylindrical axis 220B, each of which may be defined as being aligned with the first meridian or second meridian of its corresponding cylindrical LCL 202A or 202B. Additionally, in at least some examples, first cylindrical axis 220A and second cylindrical axis 220B are not coaligned about optical axis 222. In some examples, first cylindrical axis 220A and second cylindrical axis 220B are rotationally offset from each other by some angle greater than zero degrees and less than 180 degrees. In some specific examples, first cylindrical axis 220A and second cylindrical axis 220B may be rotationally offset by 45 degrees or 90 degrees.

In some embodiments, the rotational offset between first cylindrical axis 220A and second cylindrical axis 220B may facilitate the generation of a particular cylindrical power at a specific cylindrical axis based on the cylindrical power and axis of the individual cylindrical LCLs 202A and 202B, as determined by respective first cylindrical power control signals 212A and 212B generated by controller 102. For example, controller 102 may cause first cylindrical LCL 202A to generate a first cylindrical power oriented along first cylindrical axis 220A by way of first cylindrical power control signal 212A, and may cause second cylindrical LCL 202B to generate a second cylindrical power oriented along second cylindrical axis 220B by way of second cylindrical power control signal 212B, to generate an overall desired cylindrical power oriented along a desired cylindrical axis via a combination of the first and second cylindrical powers. In some examples, the combination of the first and second cylindrical powers is a vector addition of the first and second cylindrical powers.

FIG. 4 is a perspective view of an exemplary head-mounted display (HMD) 400 that may present images to the eyes of a viewer as part of a VR, AR, or MR system. To present these images, HMD 400, in some embodiments, may include at least one display system 402 that provides astigmatic (and possibly spherical) optical correction for an eye of a viewer. In some embodiments, two display systems 402, one per user eye, may be incorporated in HMD 400.

Figure 5:
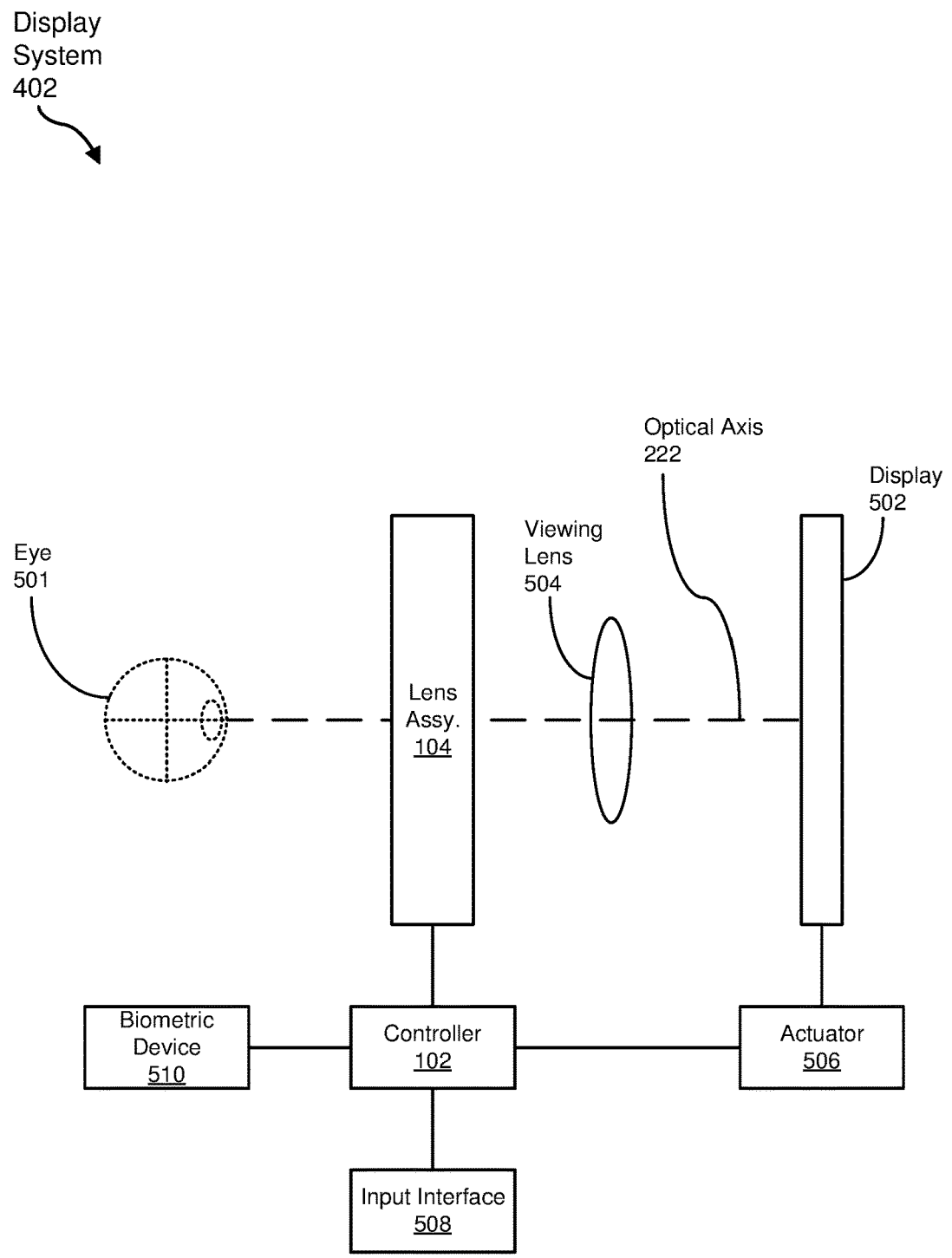
FIG. 5 is a side view of an exemplary display system for astigmatic correction employable in an HMD, such as the exemplary HMD of FIG. 4.

FIG. 5 is a side view of an exemplary display system 402 that may be employed within an HMD (e.g., HMD 400 of FIG. 4). As shown, display system 402 may include a display 502 (e.g., a liquid crystal display (LCD), a liquid crystal on silicon (LCoS) display, an organic light-emitting diode (OLED) display, and so on) located on optical axis 222 with an eye 501 of a viewer. In some examples in which two display systems 402 are incorporated in a single HMD 400, a single shared display 502 may be used for both display systems 402.

Also located on optical axis 222, between display 502 and eye 501, may be lens assembly 104 (e.g., lens assembly 104A or 104B of FIGS. 2 and 3) communicatively coupled with controller 102. In addition, in at least some embodiments, a viewing lens 504 may be positioned along optical axis 222 between display 502 and eye 501 (e.g., between lens assembly 104 and display 502) to focus light received from display 502 into eye 501. In some examples, use of viewing lens 504 may cause images provided by display 502 to occupy a greater amount of the field of view (FOV) of eye 501 to provide a more realistic VR, AR, or MR experience.

Additionally, display system 402 may include an actuator 506 communicatively coupled with controller 102 and mechanically coupled with at least one optical component along optical axis 222. In the particular example of FIG. 5, actuator 506 is mechanically coupled with display 502 to move display 502 along optical axis 222 closer to and/or farther from viewing lens 504. In other embodiments, one or more actuators 506 may be mechanically coupled with display 502, lens assembly 104, and/or viewing lens 504 to move one or more of these components along optical axis 222. While the example of display system 402 shown in FIG. 5 depicts a linear optical axis 222, other embodiments may more generally employ an optical path that includes a linear optical axis 222, or that follows a non-linear optical path by way of one or more mirrors, lenses, and/or other optical components.

Movement of display 502 and/or other optical components along optical axis 222, in some examples, may provide a more three-dimensional experience for the viewer by causing eye 501 to refocus on light from display 502 in response to a movement of display 502 and/or other components along optical axis 222. Additionally or alternatively, such movement may facilitate spherical (e.g., symmetrical) optical correction for eye 501. Consequently, in such examples, controller 102 may employ lens assembly 104 (e.g., as described above in reference to FIGS. 1-3) in conjunction with movement of display 502 and/or other optical components along optical axis 222 using actuator 506 to provide substantially complete (e.g., spherical and cylindrical) optical correction for eye 501.

In some embodiments, display system 402 may include an input interface 508 and/or a biometric device 510, each or both of which may be used to receive or determine the eyeglass prescription (e.g., the sphere, cylinder, and axis components) for eye 501. In some examples, the viewer may employ input interface 508 to manually enter the eyeglass prescription for each eye 501. In some embodiments, input interface 508 may be incorporated within HMD 400, and may include one or more buttons and/or other input components. In other examples, input interface 508 may be provided by another electronic device (e.g., computer, smartphone, of the like) communicatively coupled with HMD 400.

In some embodiments, the viewer may employ input interface 508 to select potential values for each component of the eyeglass prescription presented to the viewer via display 502. In other examples, the viewer may use input interface 508 to manipulate one or more of the prescription components while viewing test patterns or other images on display 502 to render the patterns or images focused from the viewer's perspective while controller 102 controls lens assembly 104 and/or actuator 506. Once the patterns or images appear to be focused, the viewer may then indicate that fact to controller 102 via input interface 508 so that controller 102 may store (e.g., in a memory communicatively coupled to controller 102) corresponding values associated with the eyeglass prescription (e.g., the eyeglass prescription components, values for control signals provided to lens assembly 104 and/or actuator 506, etc.) in conjunction with identifying information for the viewer so that controller 102 may provide the appropriate optical correction for eye 501 of the viewer during subsequent uses of display system 402 by the viewer.

In some embodiments, biometric device 510 may detect a biological characteristic of the viewer. Examples of the biological characteristic detected may include, but are not limited to, a fingerprint, an iris, or a retina of the viewer. Consequently, biometric device 510 may be, for example, an image scanner capable of detecting the desired biological characteristic. Based on the biological characteristic, controller 102 may determine an identity of the viewer based on the biological characteristic. For example, the viewer may have previously entered identifying information (e.g., viewer name, viewer identifier, or the like) via input interface 508 when the viewer originally set up the display system 402 to provide the appropriate optical correction (e.g., as discussed above). Moreover, controller 102 may store the biological characteristic of the viewer with the identifying information. For a subsequent use of display system 402 by the viewer, controller 102 may employ biometric device 510 to detect the biological characteristic of the viewer, determine the viewer identity by way of the detected biological characteristic, retrieve the previously stored information associated with the eyeglass prescription of the identified viewer, and employ that information to control lens assembly 104 and/or actuator 506 to provide appropriate optical correction for eyes 501 of the viewer.

In some embodiments, the biological characteristic detected by biometric device 510 may indicate the eyeglass prescription for eyes 501 of the viewer. For example, biometric device 510 may include an optical wavefront sensor that detects one or more optical characteristics of eyes 501, such as the shape of the corneas and/or lenses of eyes 501. Based on the detected biological characteristics, controller 102 may generate the eyeglass prescription or related information for eyes 501 of the viewer and generated control signals for lens assembly 104 and/or actuator 506 to apply the proper optical correction for eyes 501 of the viewer. Controller 102 may also, in some examples, store the prescription-related information in conjunction with an identifier for the viewer so that lens assembly 104 and/or actuator 506 may be controlled or configured properly the next time the viewer uses display system 402, as explained above.

Figure 6:
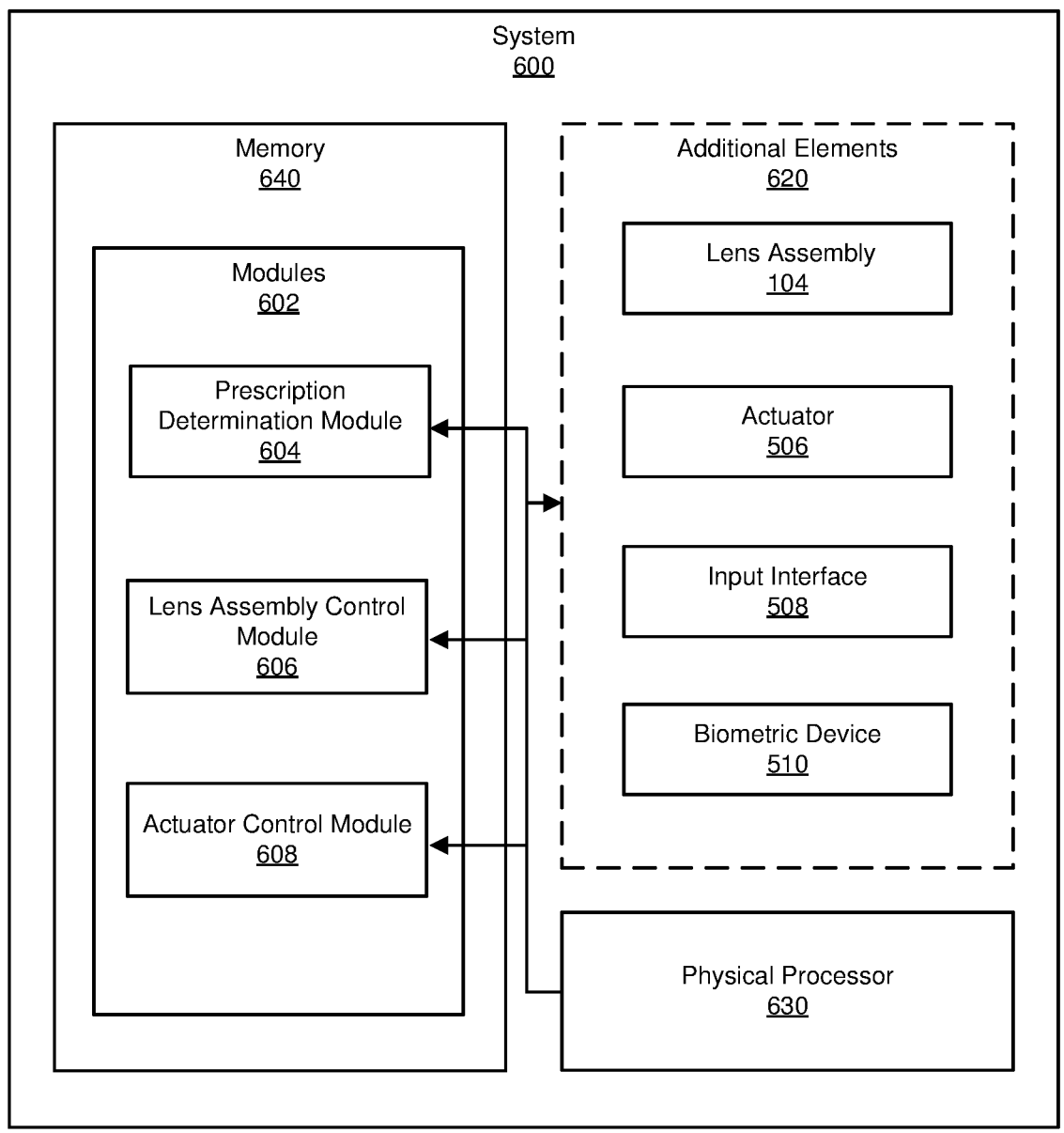
FIG. 6 is a block diagram of an exemplary system that may include the exemplary system of FIG. 5.

FIG. 6 is a block diagram of an exemplary system 600 including lens assembly 104 (e.g., lens assembly 104A or 104B of FIGS. 2 and 3), as discussed above. As illustrated in FIG. 6, exemplary system 600 may include one or more modules 602 for performing one or more tasks. As will be explained in greater detail below, modules 602 may include a prescription determination module 604, a lens assembly control module 606, and an actuator control module 608. Although illustrated as separate elements, one or more of modules 602 in FIG. 6 may represent portions of a single module or application.

In the example embodiments described in greater detail below, system 600 may be employed as at least a portion of a display system (e.g., display system 402 of FIGS. 4 and 5) for providing astigmatic correction (and, in some implementations, spherical correction) for users of an HMD (e.g., HMD 400 of FIG. 4) or other display device. Such a system may include additional elements 620, such as lens assembly 104 (e.g., lens assembly 104A or 104B of FIGS. 2 and 3), actuator 506, input interface 508, and biometric device 510. Additionally, one or more modules 602 and/or additional elements 620 (e.g., input interface 508), or portions thereof, may reside outside HMD 400 or other display device.

Prescription determination module 604, in some embodiments, may receive viewer identification information (e.g., from input interface 508) and/or other information (e.g., biological characteristics from biometric device 510) possibly used to identify one or more viewers, as discussed above. Additionally, prescription determination module 604 may receive biological characteristics (e.g., from biometric device 510) indicative of eyeglass prescription information for the viewers. Based on such information, prescription determination module 604 may store information indicative of an eyeglass prescription (e.g., the eyeglass prescription itself, control information for lens assembly 104 and/or actuator 506, or the like) for each viewer.

Lens assembly control module 606, in some examples, may generate one or more control signals (e.g., cylindrical power control signal 212 and cylindrical axis control signal 214 of FIG. 2, cylindrical power control signals 212A and 212B of FIG. 3, or the like) to control lens assembly 104, as discussed earlier. Similarly, in some embodiments, actuator control module 608 may generate one or more control signals to control actuator 506, as explained more fully above. Further, in some examples, lens assembly control module 606 and actuator control module 608 may base the generated control signals on the information (e.g., eyeglass prescription information, control information, etc.) generated and/or stored by prescription determination module 604, as discussed in detail above.

In certain embodiments, one or more of modules 602 in FIG. 6 may represent one or more software applications or programs that, when executed by a computing device, may cause the computing device to perform one or more tasks. One or more of modules 602 in FIG. 6 may also represent all or portions of one or more special-purpose computers configured to perform one or more tasks.

As illustrated in FIG. 6, system 600 may also include one or more memory devices, such as memory 640. Memory 640 generally represents any type or form of volatile or non-volatile storage device or medium capable of storing data and/or computer-readable instructions. In one example, memory 640 may store, load, and/or maintain one or more of modules 602. As illustrated in FIG. 6, system 600 may also include one or more physical processors, such as physical processor 630, that may access and/or modify one or more of modules 602 stored in memory 640, thus operating as controller 102 of FIGS. 1-3 and 6. Additionally or alternatively, physical processor 630 may execute one or more of modules 602. In yet other example embodiments, one or more of modules 602, or portions thereof, instead may be implemented as hardware components not stored in memory 640, such as electronic circuitry for performing one or more tasks described above. Additionally, in some examples, memory 640 may include information generated and/or employed by modules 602 (e.g., viewer identifiers, information describing detected biological characteristics for the viewers, eyeglass prescriptions of the viewers, control information for lens assembly 104 and/or actuator 506, and so on), as described above.

In other examples, some functionality described above as performed by physical processor 630 executing modules 602 may instead be performed by special-purpose circuitry included in system 600.

Figure 7:
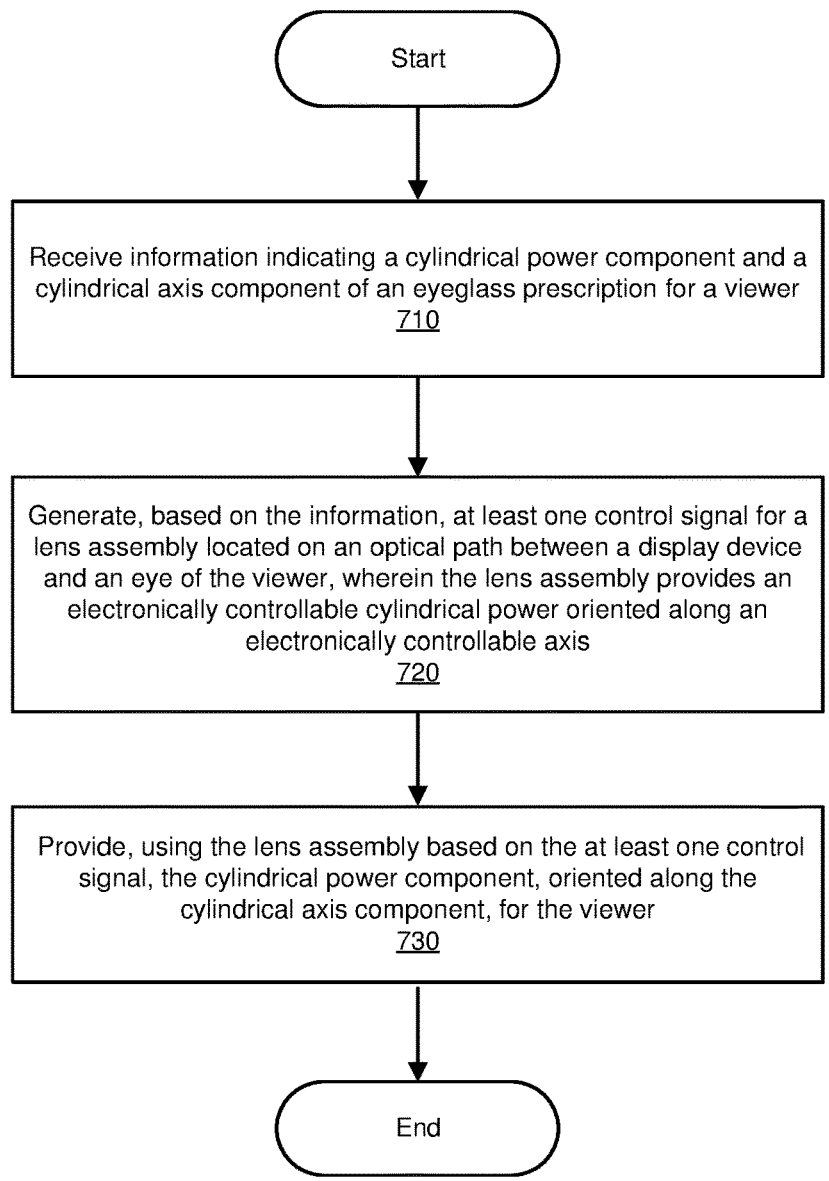
FIG. 7 is a flow diagram of an exemplary method of astigmatic correction.

FIG. 7 is a flow diagram of an exemplary method 700 for astigmatism correction. The steps shown in FIG. 7 may be performed by any suitable computer-executable code and/or computing system, including the system(s) illustrated in FIGS. 1-6. In one example, each of the steps shown in FIG. 7 may represent an algorithm whose structure includes and/or is represented by multiple sub-steps, examples of which are described above in greater detail.

As illustrated in FIG. 1, at step 710, information may be received (e.g., by prescription determination module 604) indicating a cylindrical power component and a cylindrical axis component of an eyeglass prescription for a viewer. The information received may be the actual components of the eyeglass prescription or other information (e.g., biological characteristic information) indicative of the cylindrical power component and the cylindrical axis component. At step 720, based on the information, at least one control signal for a lens assembly (e.g., lens assembly 104) located on an optical path between a display device (e.g., display 502) and an eye of the viewer is generated (e.g., by lens assembly control module 606). In at least some examples, the lens assembly may provide an electronically controllable cylindrical power oriented along an electronically controllable axis, as discussed above. At step 730, using the lens assembly based on the at least one control signal, the cylindrical power component, oriented along the cylindrical axis component, is provided for the viewer.

As explained above in conjunction with FIGS. 1 through 7, the lens assemblies described herein, as well as the systems and methods employing such assemblies, may facilitate astigmatic correction (and possibly spherical correction) of a viewer using an HMD or other display system, thus potentially eliminating the need for the viewer to don eyeglasses while using the display system, which may be difficult given possible space constraints between the eyes of the viewer and components of the display system. Additionally, use of prescription eyeglasses may compromise one or more functions of the display system, such as the focusing of light from the display onto the eyes of the viewer, and the tracking of eye movements to enhance display system functionality. Thus, in some examples, use of the disclosed systems and method may enhance both display functionality and user comfort.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive biological characteristic data (e.g., scanning data, optical correction data, etc.) of a viewer to be transformed, and transform the received data into control signals for a lens assembly to provide astigmatism correction. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:
a lens assembly that provides an electronically controllable cylindrical power, oriented along an electronically controllable axis, on an optical path between a display device and an eye of a viewer, wherein the lens assembly comprises:
  a first liquid crystal lens providing a first electronically controllable cylindrical power, oriented along a first constant axis, in response to a first control signal; and
  a second liquid crystal lens providing a second electronically controllable cylindrical power, oriented along a second constant axis that is rotationally offset from the first constant axis, in response to a second control signal; and
a controller that:
  receives information indicating a cylindrical power component and a cylindrical axis component of an eyeglass prescription for the viewer;
  determines, based on the information, the first and second electronically controllable cylindrical powers that result in providing the cylindrical power component, oriented along the cylindrical axis component, for the viewer; and
  generates, based on the first and second electronically controllable cylindrical powers, the first and second control signals to cause the lens assembly to provide the cylindrical power component, oriented along the cylindrical axis component, for the viewer without physical rotation of either the first liquid crystal lens or the second liquid crystal lens.

2. The system of claim 1, wherein a rotational offset between the first constant axis and the second constant axis ranges from greater than zero degrees to less than 180 degrees.

3. The system of claim 2, wherein the rotational offset between the first constant axis and the second constant axis is approximately 45 degrees.

4. The system of claim 1, wherein:
the system further comprises an actuator that alters a distance between the display device and the eye of the viewer based on at least one additional control signal; and
the controller:
  receives further information indicating a spherical power component of the eyeglass prescription for the viewer; and
  generates, based on the further information, the at least one additional control signal to compensate for the spherical power component for the viewer.

5. The system of claim 1, wherein:
the system further comprises:
  a viewing lens on the optical path between the display device and the eye of the viewer; and
  an actuator that alters a distance between the viewing lens and the display device based on at least one additional control signal; and
the controller:
  receives further information indicating a spherical power component of the eyeglass prescription for the viewer; and
  generates, based on the further information, the at least one additional control signal to compensate for the spherical power component for the viewer.

6. The system of claim 1, further comprising:
an input interface that receives the information indicating the cylindrical power component and the cylindrical axis component of the eyeglass prescription for the viewer.

7. The system of claim 6, further comprising:
a memory that stores the information received via the input interface; and
a biometric device that detects a biological characteristic of the viewer;
wherein the controller:
  determines an identity of the viewer based on the biological characteristic; and
  retrieves the information from the memory based on the identity of the viewer.

8. The system of claim 7, wherein the biological characteristic comprises a characteristic of at least one of a fingerprint, an iris, or a retina of the viewer.

9. The system of claim 1, wherein:
the system further comprises a biometric device that detects a biological characteristic of the viewer; and
the controller generates, based on the biological characteristic, the information indicating the cylindrical power component and the cylindrical axis component of the eyeglass prescription for the viewer.

10. The system of claim 9, wherein the biometric device comprises an optical wavefront sensor.

11. A system comprising:
a display device that provides an image to be viewed by a viewer;
a lens assembly that provides an electronically controllable cylindrical power, oriented along an electronically controllable axis, on an optical path between the display device and an eye of the viewer, wherein the lens assembly comprises:
  a first liquid crystal lens providing a first electronically controllable cylindrical power, oriented along a first constant axis, in response to a first control signal; and a second liquid crystal lens providing a second electronically controllable cylindrical power, oriented along a second constant axis that is rotationally offset from the first constant axis, in response to a second control signal;

an actuator that alters an effective focal length between the eye of the viewer and the display device based on at least one additional control signal; and a controller that:
    receives information indicating a spherical power component, a cylindrical power component, and a cylindrical axis component of an eyeglass prescription for the viewer;
    determines, based on the information, the first and second electronically controllable cylindrical powers that result in providing the cylindrical power component, oriented along the cylindrical axis component, for the viewer;
    generates, based on the first and second electronically controllable cylindrical powers, the first and second control signals to cause the lens assembly to provide the cylindrical power component, oriented along the cylindrical axis component, for the viewer without physical rotation of either the first liquid crystal lens or the second liquid crystal lens; and
    generates, based on the information, the at least one additional control signal to compensate for the spherical power component for the viewer.

12. The system of claim 11, wherein the actuator moves the display device relative to the eye of the viewer to alter the effective focal length between the eye of the viewer and the display device based on the at least one additional control signal.

13. The system of claim 11, wherein:
    the system further comprises a viewing lens on the optical path between the display device and the eye of the viewer; and
    the actuator moves the viewing lens relative to the display device to alter the effective focal length between the eye of the viewer and the display device based on the at least one additional control signal.

* * * * *